April 12, 1955     W. O. THOMPSON     2,705,872

VAPORIZING APPARATUS

Filed Oct. 20, 1949     6 Sheets-Sheet 1

INVENTOR.
William O. Thompson
BY
Eugene E. Stevens
ATTORNEY.

April 12, 1955  W. O. THOMPSON  2,705,872
VAPORIZING APPARATUS
Filed Oct. 20, 1949  6 Sheets-Sheet 2

INVENTOR.
William O. Thompson
BY
Eugene E. Stevens
ATTORNEY.

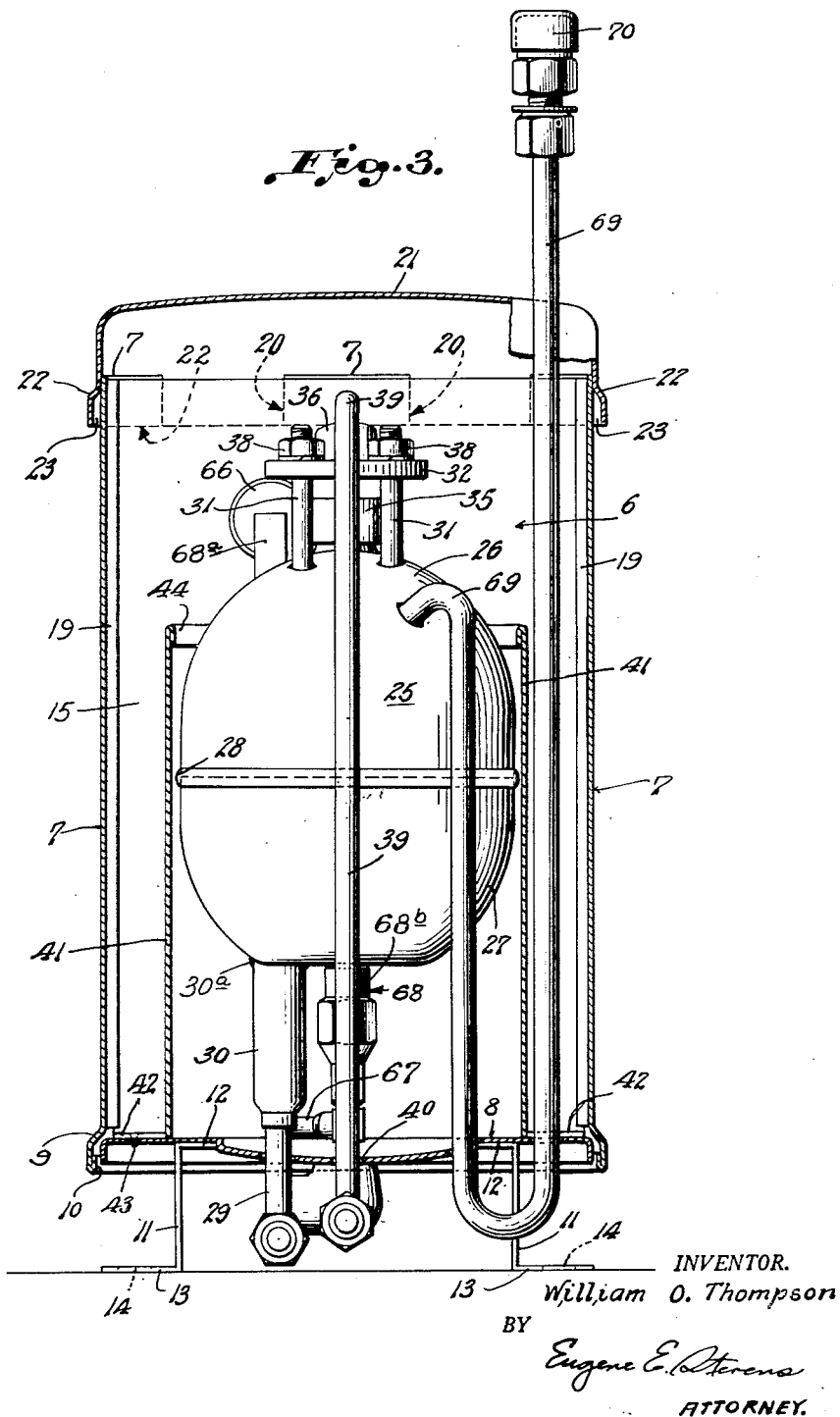

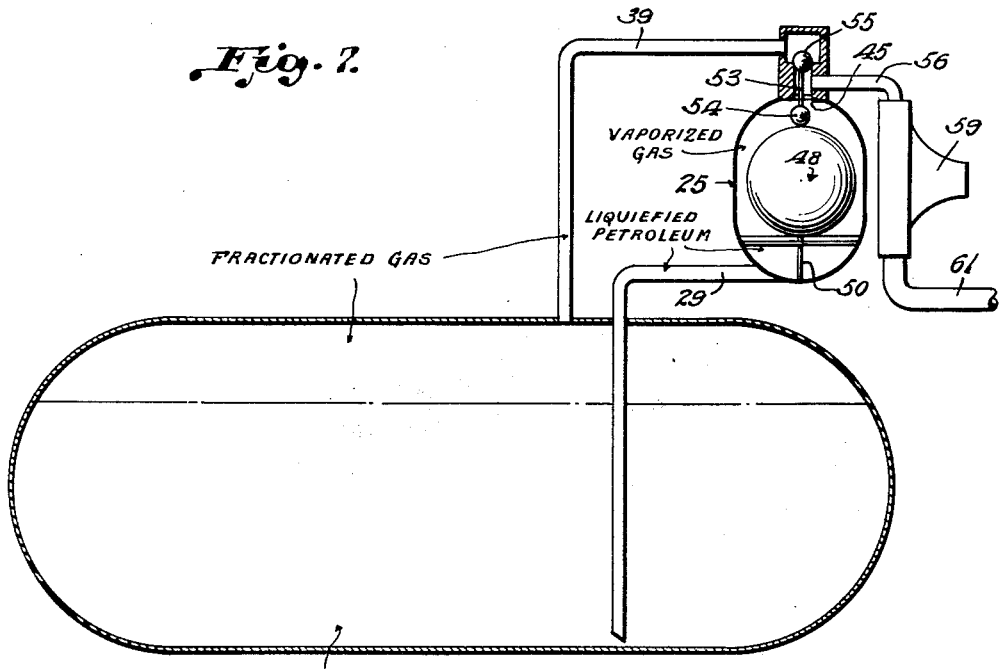
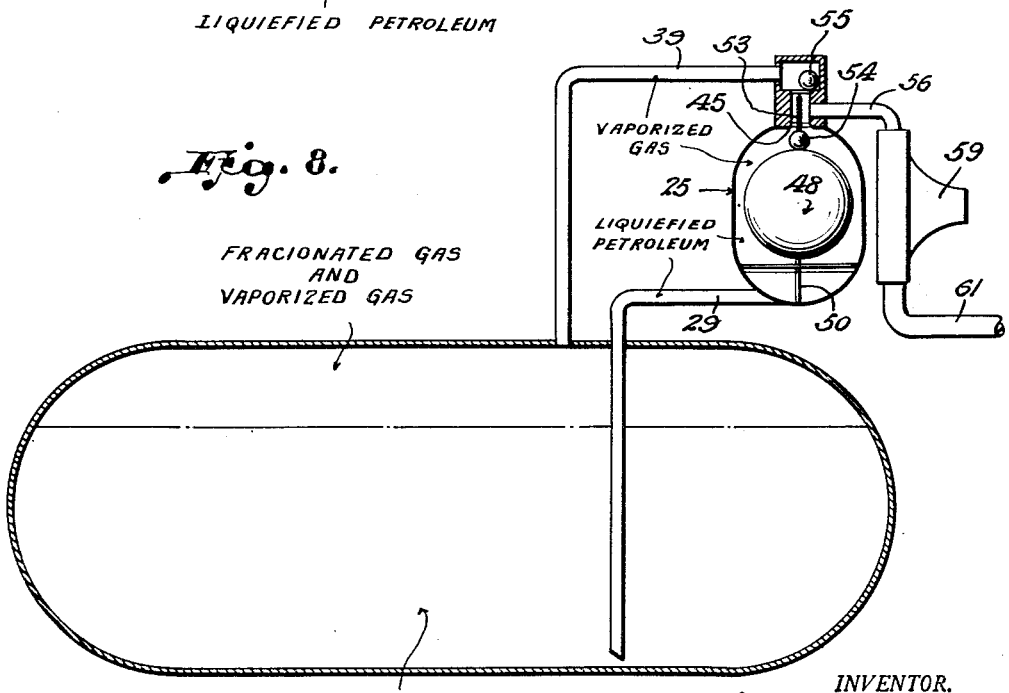

April 12, 1955 W. O. THOMPSON 2,705,872
VAPORIZING APPARATUS

Filed Oct. 20, 1949 6 Sheets-Sheet 6

INVENTOR.
William O. Thompson
BY Eugene E. Stevens
ATTORNEY.

United States Patent Office

2,705,872
Patented Apr. 12, 1955

2,705,872

VAPORIZING APPARATUS

William O. Thompson, San Francisco, Calif., assignor to Universal Equities Company, a corporation of Rhode Island Application October 20, 1949, Serial No. 122,497

10 Claims. (Cl. 62—1)

This invention relates to vaporizing apparatus, and more particularly to a vaporizer which is adapted to vaporize liquefied hydrocarbons and mixtures thereof.

An important object of the invention is to provide such a vaporizing apparatus including automatic means wherein the rate of the vaporization of the liquid is controlled by the rate of consumption of the gas formed.

A further and important object of the invention is to furnish a liquefied hydrocarbon vaporizer including a storage tank in combination with said vaporizer, a heat exchanger element of chambered form, an inlet pipe from the storage tank connecting the bottom of the heat exchanger element to the tank, a vaporized gas passage at the upper portion of the heat exchanger, a vapor outlet pipe connected to the valve passage and leading to a regulator valve and from thence to a service supply line, and to one side of the regulator valve is connected a gas feed pipe leading to a burner at the base of the heat exchanger, and a thermostatically actuated valve controlling the gas feed to the burner, the thermostatic valve being controlled by the temperature of the heat exchanger.

A further object of the invention includes the provision of a regulator valve and a thermostatic valve, the latter of which controls fuel to the heat exchange burner as determined by the temperature of the heat exchanger or the liquid or vapor therein; or its pressure or level or relative levels.

A further object of the present invention is to make it possible to position the vaporizing apparatus above, on a level with or below the liquefied hydrocarbon storage tank, as desired, and thereby derive the benefit of the pressure differential between the storage tank and the vaporizing unit and its unique valve arrangement for seating a surplus flow valve and also to increase the effective vaporizing capacity of the unit by retarding flooding due to this positioning.

A further object of the invention incorporates a novel valve structure in combination with the heat exchanger of the vaporizer whereby the upper, or surplus flow, valve is automatically seated and unseated as determined by the demand on the service line to permit warm vapors to return to the storage tank and thereby repressurize the storage tank pressure, that is, vaporize some of the liquid within the storage tank or so heat it as to raise its vapor pressure, or superheat, and thereby raise the pressure of the vapor space of the storage tank.

A still further object of the present invention is to provide a unique valve arrangement adjacent the heat exchanger comprising two valves, both valves being operated upon as by liquid level and/or pressure differential within the heat exchanger and/or the storage tank, and the upper, or surplus flow, valve being seated and/or unseated as by pressure differential between the storage tank and the heat exchanger, thus permitting a passage of vapor in either direction between the heat exchanger and the storage tank.

Other objects and advantages will become apparent to those skilled in the art when the vaporizer is considered in connection with the accompanying drawings, in which a preferred form of the invention is illustrated and in which—

Fig. 3 is an end elevational view partly broken and partly in section showing the interior of the casing 7 as seen from the right in Fig. 1;

Fig. 7 is a diagrammatic view similar to Fig. 6, showing the position of the valves under a second phase of an over-capacity demand at the service line when there is no flow in vapor pipe 39;

Fig. 8 is a diagramamtic view similar to Fig. 5, but showing the valve positions during an under-capacity demand when warm vaporized gas is flowing in pipe 39 from the heat exchanger to the storage tank.

Figure 1:
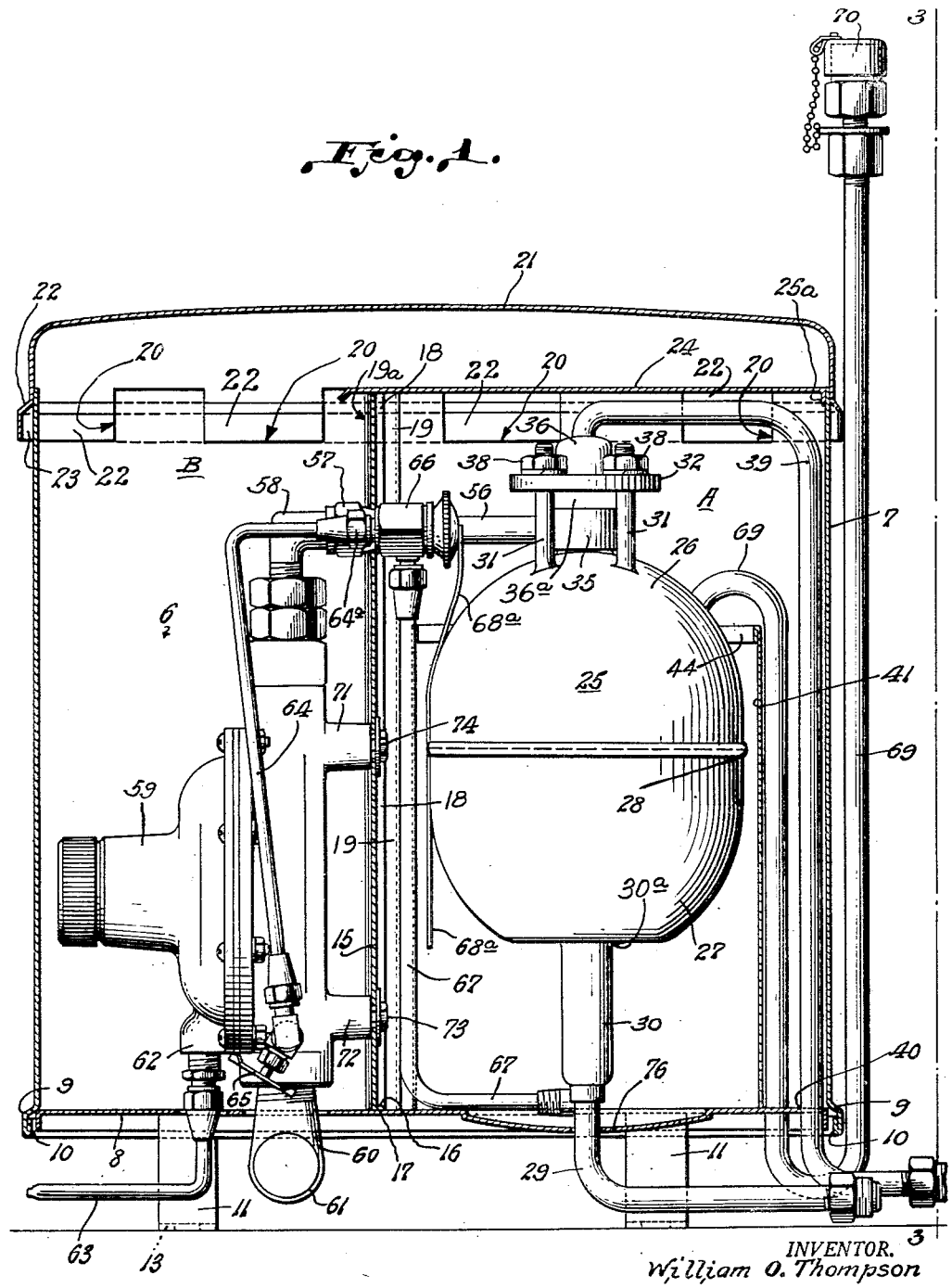
Fig. 1 is a vertical longitudinal sectional view, partly in section, showing the various elements of the vaporizer.

Referring specifically to the drawings, in which like numerals indicate similar parts throughout the various views, the vaporizer as a complete unit is generally indicated at 6 and comprises a substantially oval tubiform metal casing 7 which encloses a vaporizing unit.

A bottom plate 8 of the same shape as the oval tubiform casing 7 fits within the lower skirt portion of the casing 7, which casing has an outstanding marginal flange 9 whose lower edge is inturned as indicated at 10 to provide a strengthening means for the lower skirt portion of the casing. The bottom plate 8 is provided with the necessary openings to accommodate various pipes of the vaporizing apparatus which extend therethrough. The bottom plate 8 is further provided with four legs, or supporting feet, 11 welded or otherwise secured to the bottom plate 8 at 12 and extending downwardly into offset foot portions 13 which are provided with holes 14 for the reception of fastening bolts or the like.

In order to strengthen the casing 7 and further provide a supporting means for various elements of the vaporizer and separate the burner from the regulator, the bottom plate 8 is provided with a transverse partition 15, which partition is provided at its lower portion with a flange 16 which is welded or otherwise secured to the bottom plate 8 as indicated at 17, the partition plate 15 further being provided at its respective sides with flanged members 18 which are adapted to be received in guides 19, 19a attached to the respective inner sides of the casing 7. The top of the oval tubiform casing 7 is open and is provided around its upper edge with a plurality of cut-outs 20, the purpose of which will be later described.

The oval tubiform casing 7 is provided with a cover 21 having an outwardly flanged skirt portion indicated at 22 forming a space 23 between the upper portion of the casing and the cover whereby products of combustion within the casing 7 are adapted to pass through the outlet openings 20 into the space 23 and out of the casing to release heated products therefrom.

Figure 2:
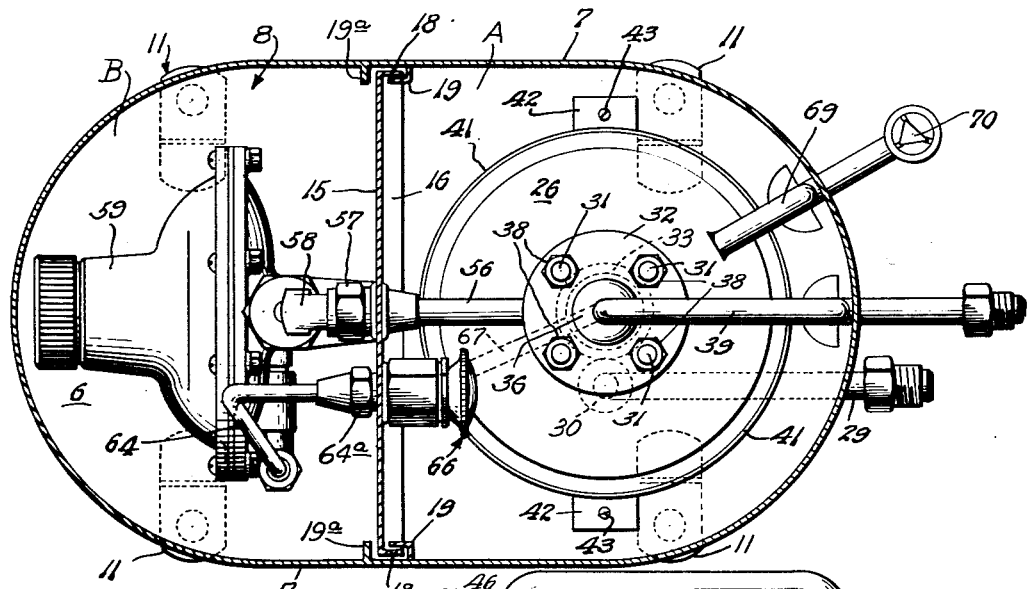
Fig. 2 is a top plan view of the heat exchanger and related elements with the casing cover removed, the casing and a partition therein being shown in horizontal section.

As heretofore intimated, the casing is divided into two sections or chambers A and B by the transverse partition 15, and the right hand section A as viewed in Figs. 1 and 2 is covered by a baffle plate 24 which at one side has an inturned flange 25a which fits within the outer casing 7, the other end of the baffle plate 24 resting on the top surface of the partition 15. It will, of course, be understood that this baffle plate 24 is of substantially the same contour as the casing 7 and when in place acts in the nature of a seal cover for the right hand section or chamber A to substantially isolate the exchanger and its burner from the remainder of the apparatus. It will readily be seen that with the cover 21 removed from the casing 7, the casing can be grasped as by its sides and easily removed from the bottom 8 and thereby expose all parts of the unit.

The casing 7, as heretofore stated, is divided by the partition plate 15 into two chambers A and B, the chamber A being adapted to receive what might be termed the vaporizing or heat exchange unit, while the chamber B is adapted to receive a regulator valve and other pipe connections. Thus, the right hand casing chamber A is provided with a heat exchanger or vaporizing device 25 which is substantially dome-ended, top and bottom, as shown and comprises the top and bottom sections or halves 26 and 27, the two sections being welded together along their mid-portions as indicated at 28.

Figure 4:
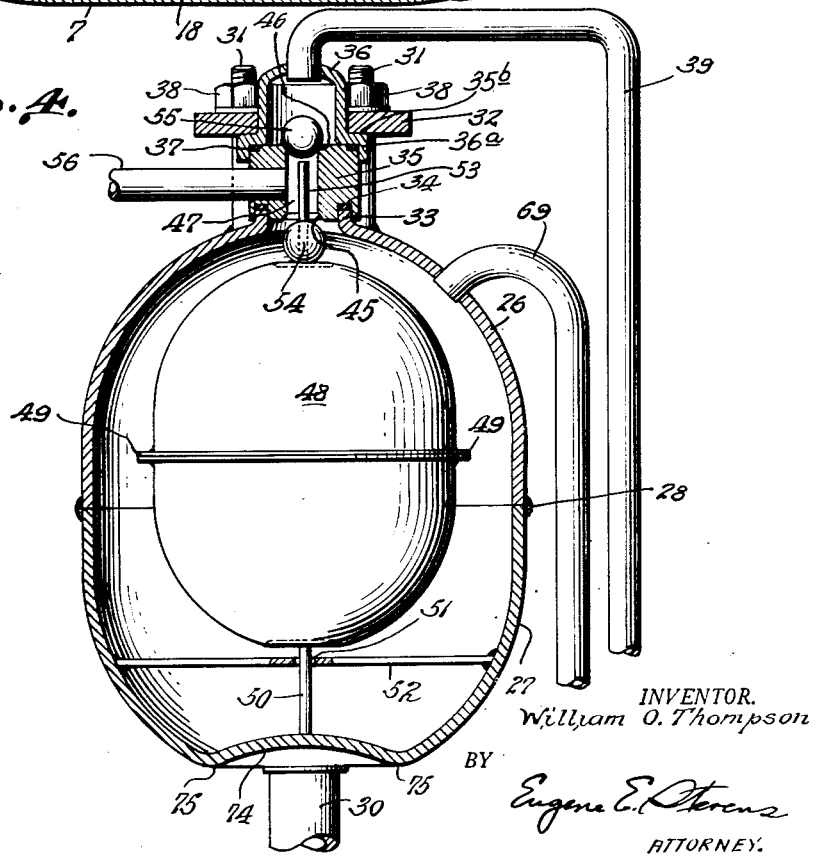
Fig. 4 is a detailed sectional view of the heat exchanger and its associated valve structure.

The heat exchange or vaporizing unit 25 is supplied, from a liquefied hydrocarbon storage tank, shown in Figs. 5-9, inclusive, as by the pipe 29, said pipe terminating in an enlarged portion 30 and being welded as at 30a to an opening offset to one side in the bottom section 27 of the vaporizing unit (see Figs. 1, 2, 3 and 4). Rising from the top of the heat exchange unit 25 are four bolts or posts 31 which are welded thereto and are spaced to define the corners of a square, the said posts 31 passing through apertures in an annulus 32. The top of the heat exchange or vaporizing unit 25 is provided with an opening which is defined by a circular annular upstanding flanged portion 33 (Fig. 4) said portion extending within a circular recess 34 formed in the lower end of a double valve seat providing member 35. The valve seat member 35 is provided with a cap 36, the lower offset marginal flange 36a of the cap 36 defining a circular recess for receiving the upper portion of the valve seat member 35. The valve seat member 35 at its top portion is provided with an annular groove which is adapted to receive packing material 37 for engagement by the juxtaposed shoulder 36b of the cap member 36 whereby to seal the same and prevent the escape of gas through said joint, as shown in Fig. 4. In assembling the device, the nuts 38 are screwed downwardly on the bolts 31 which are welded to the top 26 of the heat exchanger 25 and engage the annulus 32 which engages the shoulder portion 36b of the cap, forcing the valve seat member 35 into tight engagement with the flange 33 of the heat exchanger portion 26 and thereby holding the valve seat, cap and other members in proper relation. Extending from the top of the cap portion 36 is a return pipe 39 which is affixed to or tapped within the cap 36 and extends downwardly along the inner side of casing 7 and through an opening 40 in the bottom plate 8, to which it is welded and returns to the storage tank.

The heat exchanger unit 25 is further provided with an upstanding circular shield member 41 having at its lower end at oppositely spaced points outwardly turned flange parts 42 (Figs. 2 and 3) provided with openings for receiving screws such as 43 whereby the same may be securely attached to the base plate 8. The upper edge of the shield 41 terminates adjacent the upper end of the heat exchanger unit 25 and is turned inwardly upon itself as indicated at 44 for strengthening purposes. Thus, the shield member 41 substantially surrounds the heat exchanger unit and serves to confine the warm products of combustion to said heat exchanger unit, helps to keep the casing 7 cooler than it would be without such shield, and at the same time prevents the formation of ice on the sides of the heat exchanger unit when the device is operating under fairly heavy load conditions in a cool, damp climate.

The valve casing 35 is provided with two oppositely disposed valve seats, the one at the bottom being indicated at 45 and the one at the top being indicated at 46, and the same are connected by longitudinal gas channel 47.

The interior of the heat exchange unit 25 is provided with a float 48 (see Fig. 4) which is rounded at its top and bottom ends and comprises two halves which are affixed or welded together as at their meeting flange portions 49. The float further is provided at its lower end with a guide pin 50 which is adapted to reciprocate in an opening 51 in a guide cross strap 52 which is attached to the walls of the lower member 27 of the heat exchanger. The upper portion of the float 48 is provided with a concentric pin 53 to which is attached rigidly a ball valve 54, said valve being adapted to seat on the lower seat 45 of the valve casing 35 when the float 48 is moved to its uppermost position as by the action of liquid within the exchanger 25. A freely movable ball valve 55 is positioned within the cap member 36 and normally, by gravity and/or differential pressure, seats on the upper seat 46. However, this valve 55 is adapted to be unseated by the pin 53 when the float 48 has moved to its upper position or when differential pressures, resulting from load conditions, cause it to be unseated and allow heated vapor to pass from the heat exchanger element to the storage tank as will be presently explained.

Referring specifically to Figs. 1 and 2, the valve casing 35 is drilled on one side and into this hole is positioned the inlet end of the service line supplying gas or fuel pipe 56. Said pipe extends through the partition 15 and is connected as by coupling 57 to an elbow 58, said elbow leading to a pipe which is connected to the inlet of a pressure regulator valve 59. Said regulator may be of any well-known type and, therefore, it is not considered necessary to describe the same. The lower portion of the regulator valve 59 has tapped therein an elbow 60 which extends downwardly through an opening in the bottom plate 8 and terminates in a pipe 61 which leads to the desired service supply line, that is, the pipe 61 leads vaporized gas to the desired point or points of consumption or use, as a household burner or the like.

The regulator valve 59 has the usual valve controlled opening 62 on the opposite side of the diaphragm from the fuel supply, and this opening is controlled by a hand valve 63 which, in effect, lets the regulator breathe, all of this being standard construction.

Tapped within the lower outlet portion of the regulator valve is a gas supply pipe 64, for the burner 68 under vaporizing unit or heat exchanger 25. Flow through pipe 64 is controlled by hand valve 65, said valve being open and closed to determine the amount of fuel which will be fed to the pipe 64. The pipe 64 leads to a connection 64a on the left hand side of the plate 15 (see Fig. 1) and fuel passes through said connection to a thermostatic valve casing 66. From valve casing 66 fuel flow to burner 69 (see Figs. 2 and 3) passes through pipe 67 leading downwardly along the partition wall 15, as indicated in Fig. 1, the pipe 67 terminating in an upwardly directed burner member of known construction and generally indicated at 68 and provided with the usual flame protector 68b. The burner 68 is placed substantially below and in proximity to the center of the lower half 27 of the vaporizing unit or exchanger 25 and it will thus be seen that when lighted gas is issuing from the burner, that the same heats the exchanger 25 and causes conversion of a portion of the liquefied hydrocarbon within the exchanger into a gaseous state. Attached to the usual thermostatic valve casing 66 and extending downwardly therefrom is a copper strip 68a which lies in contact with the side of the heat exchanger 25. Strip 68a has operative connection with the usual flow control valve (not shown), in thermostatic valve casings 66. Thus the reaction of the heat developed in the heat exchanger 25 controls the operation of the thermostatic valve in casing 66 to allow more or less gas to pass through the pipe 67 to the burner 68. Flow of gas to burner 68 will thus be determined by the demand on the service line 61, because the more the demand, the hotter the heat exchanger 25 will become and the greater the opening of the valve 66, and thus more gaseous fuel is delivered to the burner 68.

The heat exchanger 25, for safety purposes, is provided with a relief line 69 affixed into the top portion 26 of the heat exchanger and extended downwardly and passing through the bottom plate and upwardly outside of the casing 7 and terminating in a conventional relief valve 70. Thus, if there were no cut-off in pipe 39 leading to valve casing 35 from the supply tank of Fig. 5 so that vaporized gas could always be supplied back to the supply tank, there would be no necessity for the relief pipe 69 because all supply tanks are conventionally equipped with a relief valve. In other words, the relief pipe 69 is included simply as a safety measure in case the system should be closed up and there would be no outlet for the vaporized gas from the heat exchanger 25.

It will be noted that the regulator valve casing 59 is or may be of conventional form and it has mounting posts 71 and 72 spaced from one another and extending to the transverse partition plate 15 and attached thereto as by bolts 73, thereby forming a support for the regulator.

Further, considering the vaporizer unit or heat exchange element 25 and referring specifically to Fig. 4, it will be noted that the same is dished inwardly at its bottom as indicated at 74 so as to assure that any drippage due to condensation along the outer surface of the exchanger 25 will drop outwardly of the burner 68. It will also be noted that the bottom plate 8 has a central shallow well portion 76 which is located immediately below the bottom of the heat exchanger 25, and, more specifically, aligned with the recessed part 74 of the bottom of the heat exchanger 25. Thus, any dripping of condensate from the heat exchanger 25 will be caught in the shallow well 76 and directed down to an outlet in the bottom plate 8 immediately below the burner 68 (Fig. 3). The advantage of this is that in the winter time the condensate will, by being brought into proximity with the burner 68, be kept warm and will not freeze and can be drained out so as not to clog or otherwise gather in the casing 7 on the base plate 8 thereof.

Figure 5:
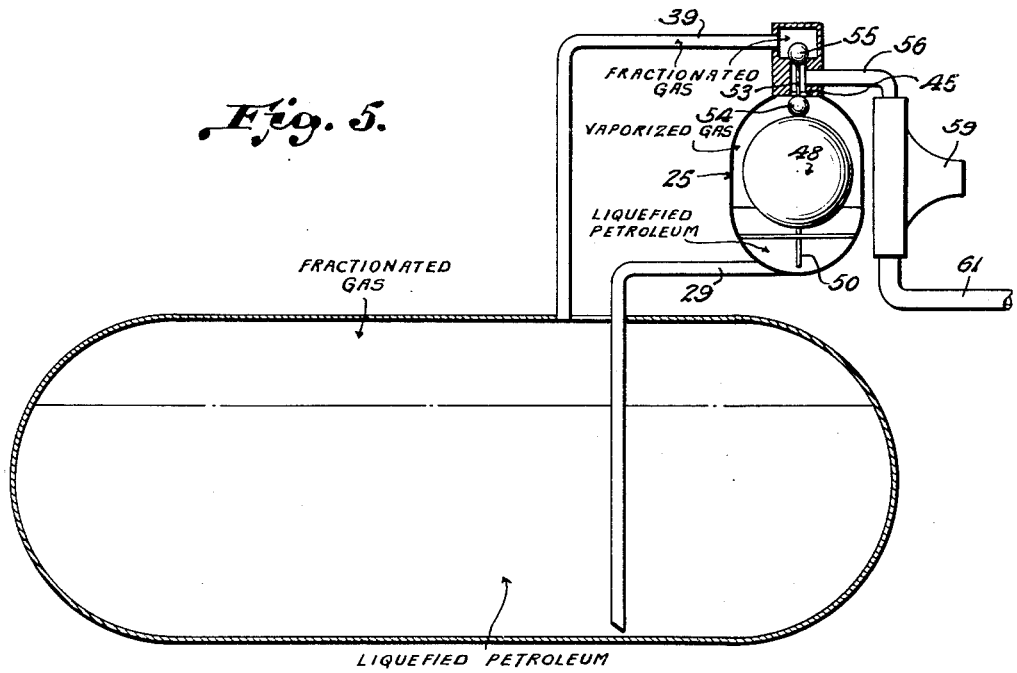
Fig. 5 is a diagrammatic view showing the vaporizer connected to a storage tank and the heat exchange unit and its valves in sectional detail, the valves being shown in the position they assume when the same is under a full capacity demand and there is no flow in vapor pipe 39.

Referring specifically to the diagrammatic illustrations disclosed in Figs. 5–9, inclusive, and referring at this time specifically to Fig. 5, it will be noted that in this illustration there is disclosed a float 48 reaching an upper position where it is just becoming buoyant and the upper float pin 53 has just come in contact with the upper or surplus flow valve 55 of casing 35. As will be noted, this valve 55, when seated, is so held by greater pressure from above the valve than below. This results from the differential of the static head in the heat exchanger 25, if the latter is situated, as shown, above the storage tank, plus the drop in pressure through the valve body 35 and in the heat exchanger 25 caused by the fuel demand. Of course, by fuel demand is meant the demand on the service line 61. This drop in pressure in heat exchanger 25 and valve body 35 is what has caused the liquid from the storage tank to rise in the heat exchanger 25, exposing a maximum amount to the hot walls of the same for converting the liquid into vapor. Thus, as heretofore said, the vaporizer in this position is supplying the service line 61, by way of pipe 56 etc., with a maximum quantity of vaporized gas.

Figure 6:
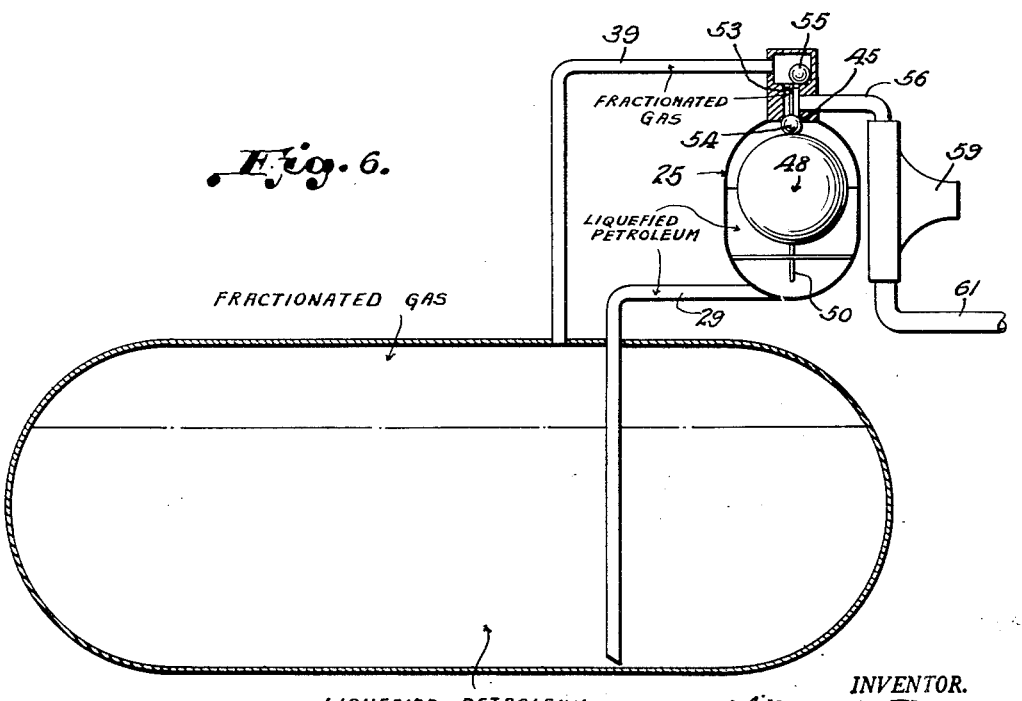
Fig. 6 is a diagrammatic view similar to Fig. 5, but showing the position of the valves under one phase of an over-capacity demand at the service line when fractionated gas is flowing in pipe 39 from storage tank to load.

In Fig. 6 is disclosed one phase of the system under what might be termed an over-capacity demand from the service line 61. Thus, this diagrammatic illustration shows the float 48 after it has become sufficiently overbuoyant to overcome the greater pressure above the upper ball valve 55. The float 48 has moved into its uppermost position, the pin 53 unseating the upper ball valve 55 and the lower ball valve 54 moving to its seat 45 and thereby closing the lower end of passage 47 so as to prevent the possibility of any liquid passing into the system or service line 61. As depicted in this diagrammatic Fig. 6 illustration and with the valves 54, 55 in the positions shown, the storage tank is supplying the service line 61 with an entire load of fractionated gas, the fractionated gas being that portion of the gas in the upper portion of the storage tank which has previously been vaporized to some extent by atmospheric conditions. With the vaporizing unit operating in the manner illustrated in Fig. 6 with valve 54 closed, the pressure of vapor acting against the liquid in the storage tank coupled with generation of vapor in heat exchanger 25 will shortly build up sufficient pressure in the heat exchanger 25 to force the liquid therefrom back to the storage tank. This causes the float 48 to drop to the Fig. 7 position and results in valve 55 closing and valve 54 opening.

Fig. 7 is a diagrammatic illustration of a second phase of the over-capacity demand from the service line 61. Thus, this diagrammatic illustration shows the float 48 after sufficient liquid has been forced back to the storage to cause the float to become unbuoyant and thereby permit the float to drop. In this position the vaporizer is supplying service pipe 61 with its entire load of vaporized gas and will continue to do so until the float 48 again becomes sufficiently overbuoyant to move back into the position indicated in Fig. 6. Thus, we have a cyclic operation of the system, and the cycles indicated in the diagrammatic illustrations 6 and 7 will be repeated time after time until the overload demand is removed.

Fig. 8 is a diagrammatic illustration of the vaporizer system when there is an under-capacity demand. Thus, in this illustration it shows the float 48 completely unaffected by the liquid level. The pressure drop, due to the small demand, has caused the liquid to rise into the heat exchanger 25, seeking a level so as to expose the proper amount to the hot walls for conversion to vapor. In this position the vaporizing unit is supplying the entire load with vaporized gas. In seeking the proper level, a surging action takes place and the liquid is forced back to storage and overpressure in the heat exchanger is built up by the dynamic head. This overpressure is relieved by blowing the upper surplus flow valve 55 off its seat and allowing warm vaporized gas to pass back to the vapor space of the storage tank. This relief causes another inward surge of liquid to the heat exchanger and the cycle is repeated. The passage of warm vapor to storage serves to superheat the vapor and pressurize the tank, as before mentioned. Warm vapors are also passed back to storage at a very substantial rate as the load on the vaporizer is varied, particularly from high to low.

It is important to note that after the float 48 has become buoyant and caused the lower, or anti-flood, valve 54 to seat during an initial phase of overload the unseating of this lower, or anti-flood, valve 54 is opposed by the pressure drop through the valve body 35. This pressure drop is governed by the construction of the valve body 35 and the action of the valves 54 and 55 as they affect this pressure drop. The float buoyancy in forcing the upper, or surplus flow, valve 55 off its seat avoids an additional pressure drop occasioned by differential pressure furnishing this force.

This flow of warm vapor from the heat exchanger 25 to the storage tank serves to prevent formation of condensate in the vapor line 61 during periods of light demand so that when overload occurs and the storage tank is called upon to furnish the demand only dry vapor is served to the load.

*Operation*

Under normal operating conditions, that is to say, when the demand on the service line 61, which, of course, is the service line to burners in a house or to other equipment, is moderate and well within the capacity of the heat exchanger 25, the float 48 will be in the position shown in Fig. 4 or 5. Thus, the vaporized gas within the heat exchanger 25, the same being vaporized as the result of the flame in the burner 68, can flow past the valve seat 45 into the pipe 56, thence to the elbow pipe 58 (see Figs. 1 and 2) into the regulator 59 and from there to the service pipe 61. However, it will be seen that the pipe 64 which is tapped into the pressure regulator 59 has some of the gas passing therethrough, which gas passes through the connection 65 into the thermostatic controlled valve 66, thence through the pipe 67 to the said burner 68. Therefore, there will be a continuous flow of gas to the burner 68, which burner will heat the heat exchange member 25 and produce a continuous amount of gas to be delivered to the service line 61. However, assuming that if the requirements for gas placed on the service pipe 61 of Fig. 1 reaches an amount above the ability of the heat exchanger 25 to supply vaporized gas, then, of course, the liquid level in the heat exchanger 25 will build up or the pressure will drop and this will cause the float 48 to rise, whereby the valve 54 at the top of the float will move upwardly to seat on its seat 45 and close the passage 47. Simultaneously, with the seating of the float stem carried valve 54 in its seat 45, the top valve 55 of the valve casing 35 will be unseated from its seat 46, this establishing communication between lines 39 and 56, as shown in the diagrammatic showing of Fig. 6. In other words, under the conditions stated, the fractionated gas always present at the top of the storage tank will be free to flow through the pipe 39, past the unseated valve 55 and into the valve passage 47, and thence, owing to the fact that the valve 54 is seated, to the pipe 56 which leads to the service line 61 by way of the regulator 59. Thus, the foregoing means that when the capacity of the heat exchanger 25 is exceeded and sufficient vaporized gas cannot be supplied, then the fractionated gas, which is always present adjacent the top of the tank and would be a mixture of the two gas components in the storage tank, for instance, propane and butane, will pass into the lines 56 and 61 and thence to the burners in the house or other equipment.

In connection with the discussion of Fig. 6, supra, it is to be noted that the amount of fractionated gas that will be supplied to the service pipe 61 by way of pipe 56 through the regulator 59 will be in direct proportion to the amount of overload or excess gas requirement as determined by the service pipe 61 in relation to the ability of the heat exchanger to supply vaporized gas.

In speaking of overload in the preceding paragraph it should be explained that "overload" is said to be present when the demand for gas in pipe 61 is in excess of the ability of the heat exchanger 25 to supply vaporized gas. The amount of fractionated gas used will be in direct relation to any excessive demand.

An extremely important feature of the invention is the ability of some of the vaporized gas to be passed back through the pipe 39 to the upper part of the tank, and, of course, it will be realized that this gas is vaporized and under substantial pressure, and besides that, it is also heated. Therefore, as best illustrated in Fig. 8, when the demand on the vaporizing unit is at moderate-demand, the vaporized gas passed back through the pipe 39 to the top of the tank, and being under pressure and being heated, causes certain liquefied hydrocarbon to vaporize or so heat it as to raise its vapor pressure, or super-heat, and thereby raise the pressure of the vapor space of the storage tank.

Further, still referring to the operation of the vaporizing device, and referring specifically to Fig. 5, there is shown a storage tank containing liquefied petroleum which fills or occupies a portion of it, the top portion being filled with fractionated gas, that is, a gaseous medium which normally would be produced in a tank of this type. Extending downwardly into the tank and adjacent the bottom thereof is a pipe 29 which leads from the tank to the bottom portion of the vaporizing unit 25, and as is shown in Fig. 5, the liquefied hydrocarbon or petroleum moves up into the chamber of unit 25 and contacts the walls of float 48, some of the liquefied hydrocarbon being vaporized into a gas which passes the valve seat 45, which, in the condition shown in Fig. 5, is open, and said vaporized gas passes through the pipe 56, through the regulator 59 and to the service pipe 61. The surplus flow valve or free ball valve 55 is forced to its seat by differential pressure between the pressure of fractionated gas in the pipe 39 which extends from the top of the storage tank to the valve casing cap 36 and the vaporized gas pressure from the heat exchanger 25. Thus, this greater pressure from pipe 39, plus gravity, seats the ball valve 55 and prevents fractionated gas from the storage tank from passing into pipe 56 under normal or moderate requirements of gas supply to service pipe 61. Of course, it will be understood that the illustration disclosed in Fig. 5 is under a normal operating condition, that is, there is only a normal service demand on the service line 61.

Referring to Fig. 6, this figure illustrates the position that the valves 54, 55 take in one phase of an over-capacity demand to service line 61. Thus, under such circumstances the liquefied petroleum passes up through the pipe 29 and moves up into the heat exchanger unit 25 and causes a buoyancy to be exerted on the float 48 which consequently moves upwardly, seating the valve 54 on its seat and at the same time unseating the ball valve 55. In this condition, fractionated gas from the top of the tank passes through the pipe 39, thence through the opened valve seat normally closed by the valve 55, thence through pipe 56, and thence to the service line 61. Thus, it will be seen that the valve arrangement 54, 55 in Fig. 6 provides for supplying the service pipe 61 with an unlimited quantity of fractionated gas from the storage tank at such times when the output capacity of vaporizing unit 25 is exceeded. However, referring to Fig. 7, this shows a second phase of an over-capacity demand and shows the particular relation of the respective valves 54, 55 when, due to pressure resulting from closure of valve 54 and vaporization within chamber 25, certain of the liquefied hydrocarbon has been forced back into the storage tank, under which conditions the lower valve 54 and the float 48, when it becomes unbuoyant, move downwardly, in which position the fractionated gas from the storage tank passing through the connecting pipe 39 again causes pressure on the loose ball valve 55 to seat it, whereupon vaporized gas from unit 25 passes the lower valve seat 45 (see Fig. 4) through the pipe 56 through the regulator 59 and then into the service pipe 61. However, it will be realized that the first and second phases, as described with respect to Figs. 6 and 7, are a more or less automatic cycling and reverts from one to the other in a more or less a time sequence, depending upon the degree of over-demand, so long as an over-capacity demand exists at the service line 61.

In Fig. 8 is shown an under-capacity demand, that is, the demand at the service pipe 61 is sufficiently under the capacity of the heat exchanger or vaporizer 25, that the liquid in pipe 29 leads to the vaporizer 25 but the liquid does not rise very far up in the vaporizer and has no effect whatsoever on the float 48. Therefore, the float 48 is always at its lowermost position and the valve 54 is unseated. This allows vaporized gas to pass to the pipe 56 and to the service line 61. However, because the positioning of the heat exchanger 25 above the storage tank causes the liquid to seek a level commensurate with demand, but never achieve this static state, overpressures are created within the heat exchanger; these are relieved by blowing the upper, or surplus flow, valve 55 off its seat resulting in a flow of warm vapor to the storage tank. This relief of pressure in the heat exchanger 25 and increase of pressure in the storage tank causes another inflow of liquid from storage to heat exchanger 25 and the cycle is repeated. If the heat exchanger 25 is below storage tank level the flow of warm vapor to storage is constant, so long as the gas output capacity of vaporizer unit 25 is not exceeded by supply requirement on service line 61.

Figure 9:
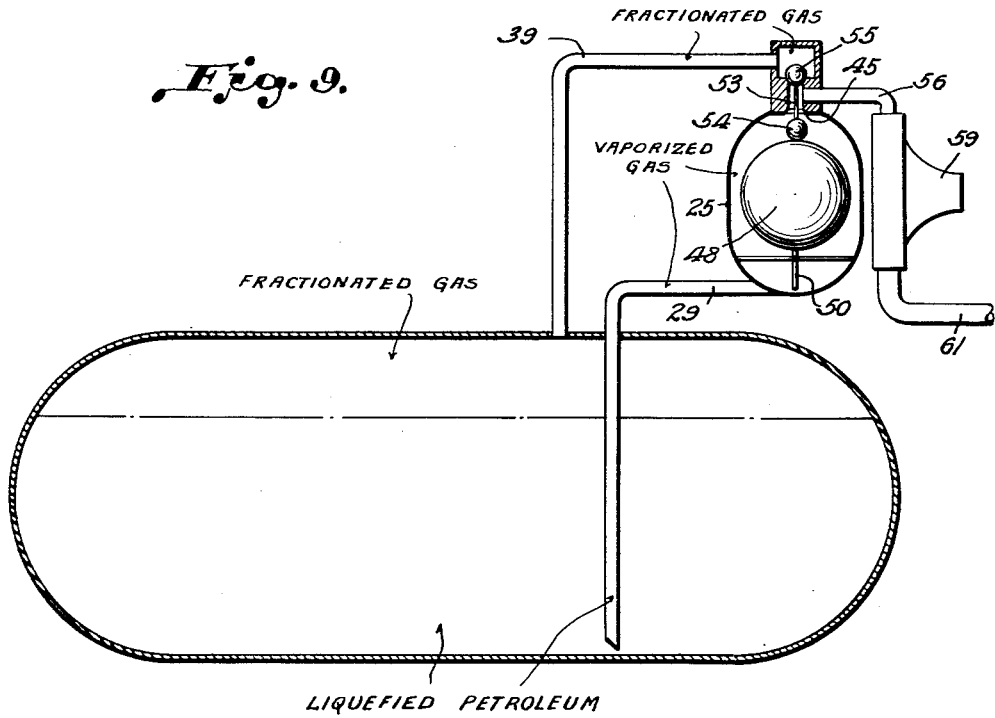
Fig. 9 is a diagrammatic view similar to Fig. 5, showing the valve positions under a no-demand condition from the service line when there is no flow in vapor pipe 39.

Referring to Fig. 9, this shows the arrangement of the vaporizing unit and the valve 54, 55 positions when there is absolutely no demand on the service line 61. Thus, in this Fig. 9 illustration the float 48 is at its lowermost position, the valve 54 is unseated, the valve 55 is seated by pressure of fractionated gas in pipe 39. However, inasmuch as there is no demand at the service pipe 61, the vaporized gas in the pipe 39 from the vaporizing unit 25 is being forced back into the storage tank and creates a condition of balance, the burner 68 burning at its lowest capacity, and the apparatus will continue in this condition until a load is placed upon the service pipe 61.

Thus, it will be seen that I have devised a very highly desirable and unique vaporizing unit in combination with a liquefied petroleum storage tank, whereby vaporized gas, from unit 25 or fractionated gas, will always be available to be delivered to the service line 61 leading into a house or other place where burners for the gas are located. Further, it will be seen that only a small portion of the gas output to pipes 56 from passage 47 (Fig. 4) is employed as a means for heating the heat exchange element or vaporizing unit 25 and that this burner 68 is controlled by the demand at the service line 61, said demand determining the temperature of the gases within the vaporizing unit 25 which, as above stated, is in contact with a copper strip 68a which is connected to a thermostatic valve 66 for controlling the admittance of gas to the burner 68. Also, the back flow through the vapor line 39 provides for repressuring and maintaining that line free of condensate.

While a desired embodiment of the invention is disclosed in the accompanying drawings, it is, of course, within the scope of the invention that the same may be modified in various details within the scope of the following claims.

Having thus described my invention, what I claim is:

1. In apparatus for dispensing petroleum gas which liquifies under pressures exceeding atmospheric, a chamber-providing heat exchanger casing having a liquid phase petroleum inlet and a service line-supplying gas discharge outlet, a burner beneath said casing bottom, said bottom having an indentation therein above said burner, and all margins of said indentation being disposed a substantial distance laterally of the plane of said burner and the flame emitted therefrom whereby to avoid putting out said burner as the result of condensation drippage from the exterior surfaces of said heat exchanger casing.

2. In apparatus for dispensing petroleum gas which liquifies under pressures exceeding atmospheric, a combined fuel-vaporizing and service line pressure-control unit comprising in combination, a base, an upstanding removable enclosure wall surrounding said base and supported thereby, an upstanding partition fixed to and extending across said base, said partition having its ends terminating adjacent opposed portions of said removable enclosure wall, slidably interengaging supporting means for said partition in part carried thereby and in part by said wall portions, said partition and removable enclosure wall-providing a vaporizing unit-receiving chamber and a regulator valve-receiving chamber above said base at opposite sides of said partition, a fuel vaporizing unit supported in said first chamber, a service line pressure regulating valve in said second chamber, and secured to said partition, and said fuel vaporizing unit having liquid inlet means and a gas outlet means connected to said regulator valve and in part supported by said partition.

3. The combination set forth in claim 2, and including a heat-confining closure for said vaporizer unit-receiving chamber and supported by said partition and removable enclosure wall.

4. The combination set forth in claim 2, and including a heat-confining closure for said vaporizer unit-receiving chamber and supported by said partition and removable enclosure wall, and a removable second closure for both chambers supported by said enclosure wall, and the latter and said last named closure having cooperating ventilation-providing means.

5. In apparatus for dispensing as gas and under pressure, a petroleum cut which gasifies at atmospheric pressures and liquifies at pressures exceeding atmospheric, said apparatus providing separate and replenishable first source and second sources of said gas under pressure, and wherein a level of liquid petroleum rises in said first source as gas volume therein diminishes and falls as gas volume therein increases, there being a valve casing and a gas passage at least in part provided thereby and communicating with each of said sources, said passage having longitudinally spaced first and second gas source inlet-providing valve seats communicating therewith, said valve seats adapted to receive separate valves which seat in the direction of gas flow from said respective sources, a gas service line communicating with said passage between said valve seats; the combination of separate independently operable first and second source flow-control valves movable in the direction of related gas source flow to engage the first and second seats, respectively; a first valve control means operatively connected thereto and responsive to first source gas volume conditions, said control means operable to seat said first valve only when said first source gas volume is diminished to a predetermined amount, said control means operating to hold said first valve unseated when there is a predetermined volume of gas in said first source; the seating and unseating of the second valve being under the control of the pressure differential at opposite sides of its seat when the first valve is unseated; a second valve unseating means operated by the seating of said first valve to unseat said second valve against second source pressure, whereby to effect service line gas supply entirely from said second source; said first source valve control means responding to a predetermined increase of first source gas volume to unseat said first valve and simultaneously move said second valve unseating means to inoperative position, whereby to permit reseating of said second valve under second source gas pressure, when the latter exceeds the pressure in said passage between said valve seats, and at other times to replenish said second source from said first source until the second valve is seated by second source pressure.

6. In apparatus for dispensing as gas and under pressure, a petroleum cut which gasifies at atmospheric pressures and liquifies at pressures exceeding atmospheric, said apparatus providing separate and replenishable first and second sources of gas under pressure; said first source comprising a chambered heating means-incorporating vaporizer having a supply connection with the bottom, or liquid phase of a closed tank of said petroleum cut which provides a vapor phase at its upper portion, and wherein a level of liquid petroleum rises in said first source as gas volume therein diminishes and falls as gas volume therein increases, and said second source the upper or vapor phase of said tank and a conduit leading therefrom; there being a valve casing and a gas passage at least in part provided thereby and communicating with each of said sources, said passage having longitudinally spaced first and second gas source inlet-providing valve seats communicating therewith, said valve seats adapted to receive separate valves which seat in the direction of gas flow from said respective sources, a gas service line communicating with said passage between said valve seats; the combination of separate independently operable first and second source flow-control valves movable in the direction of related gas source flow to engage the first and second seats, respectively; a first valve control means operatively connected thereto and responsive to first source gas volume conditions, said control means operable to seat said first valve only when said first source gas volume is diminished to a predetermined amount, said control means operating to hold said first valve unseated when there is a predetermined volume of gas in said first source; the seating and unseating of the second valve being under the control of the pressure differential at opposite sides of its seat when the first valve is unseated; a second valve unseating means operated by said first valve control means to unseat said second valve against second source pressure after predetermined movement of said first valve in its seating direction, whereby to effect service line gas supply entirely from said second source; said first source valve control means responding to a predetermined increase of first source gas volume to unseat said first valve and move said second valve unseating means to inoperative position, whereby to permit reseating of said second valve under second source gas pressure, when the latter exceeds the pressure in said passage between said valve seats, and at other times to replenish said second source from said first source until the second valve is seated by second source pressure.

7. In apparatus for dispensing as gas and under pressure, a petroleum cut which gasifies at atmospheric pressures and liquifies at pressures exceeding atmospheric, said apparatus providing separate and replenishable first and second sources of gas under pressure; said first source comprising a chambered heating means-incorporating vaporizer having a supply connection with the bottom, or liquid phase of a closed tank of said petroleum cut which provides a vapor phase at its upper portion, and wherein a level of liquid petroleum rises in said first source as gas volume therein diminishes and falls as gas volume therein increases, and said second source the upper or vapor phase of said tank and a conduit leading therefrom; there being a valve casing and a gas passage at least in part provided thereby and communicating with each of said sources, said passage having longitudinally spaced first and second gas source inlet-providing valve seats communicating therewith, said valve seats adapted to receive separate valves which seat in the direction of gas flow from said respective sources, a gas service line communicating with said passage between said valve seats the vaporizer being located above the level of the liquid of said tank; the combination of separate independently operable first and second source flow-control valves movable in the direction of related gas source flow to engage the first and second seats, respectively; a first valve control means operatively connected thereto and responsive to first source gas volume conditions, said control means operable to seat said first valve only when said first source gas volume is diminished to a predetermined amount, said control means operating to hold said first valve unseated when there is a predetermined volume of gas in said first source; the seating and unseating of the second valve being under the control of the pressure differential at opposite sides of its seat when the first valve is unseated; a second valve unseating means operated by the seating of said first valve to unseat said second valve against second source pressure, whereby to effect service line gas supply entirely from said second source; said first source valve control means responding to a predetermined increase of first source gas volume to unseat said first valve and simultaneously move said second valve unseating means to inoperative position, whereby to permit reseating of said second valve under second source gas pressure, when the latter exceeds the pressure in said passage between said valve seats, and at other times to replenish said second source from said first source until the second valve is seated by second source pressure.

8. In apparatus for dispensing as gas and under pressure, a petroleum cut which gasifies at atmospheric pressures and liquifies at pressures exceeding atmospheric, said apparatus providing separate and replenishable first source and second sources of said gas under pressure, and wherein a level of liquid petroleum rises in said first source as gas volume therein diminishes and falls as gas volume therein increases, there being a valve casing and a gas passage at least in part provided thereby and communicating with each of said sources, said passage having longitudinally spaced first and second gas source inlet-providing valve seats communicating therewith, said valve seats adapted to receive separate valves which seat in the direction of gas flow from said respective sources, a gas service line communicating with said passage between said valve seats; the combination of separate independently operable first and second source flow-control valves movable in the direction of related gas source flow to engage the first and second seats, respectively; a first valve control means operatively connected thereto and responsive to first source gas volume conditions, said control means operable to seat said first valve only when said first source gas volume is diminished to a predetermined amount, said control means operating to hold said first valve unseated when there is a predetermined volume of gas in said first source; the seating and unseating of the second valve being under the control of the pressure differential at opposite sides of its seat when the first valve is unseated; a second valve unseating means operated by said first valve control means to unseat said second valve against second source pressure after predetermined movement of said first valve in its seating direction, whereby to effect service line gas supply entirely from said second source; said first source valve control means responding to a predetermined increase of first source gas volume to unseat said first valve and move said second valve unseating means to inoperative position, whereby to permit reseating of said second valve under second source gas pressure, when the latter exceeds the pressure in said passage between said valve seats, and at other times to replenish said second source from said first source until the second valve is seated by second source pressure.

9. The combination set forth in claim 6 and a detachable cap providing the end of said valve casing and passage adjacent said second source valve seat, said cap providing a chamber as an enlargement of said passage and enclosing said second valve seat, said second valve comprising a ball located in said cap chamber, and said second source communicating with said cap chamber.

10. In an apparatus for storing and dispensing petroleum gas which liquifies at pressures exceeding atmospheric, said apparatus including a storage tank having an upper gas phase and a lower liquid phase, a chamber-providing heat exchanger means, separate conduit means connecting, respectively, the liquid phase of the storage tank with the lower part of the chamber of said heat exchanger means and connecting the gas phase of said storage tank with the upper part of the chamber of said heat exchanger means, one of said heat exchanger and gas phase conduit means providing an inter-communicating valve chamber adjacent the upper end of said heat exchanger means, spaced transverse valve seats in said valve chamber, an independently operable oppositely acting valve for each of said seats, one valve urged against its seat by pressure from said vapor phase conduit means, a float in the chamber of said heat exchanger means operated thereby to seat the other valve upon predetermined rise of the liquid level in said heat exchanger means chamber, a service pipe supply conduit leading from said valve chamber at a point between said valve seats, means operable upon the seating of said second mentioned valve for unseating said first-mentioned valve, said first-mentioned valve being retained unseated by gas pressure from the exchanger means chamber past the open second valve when such pressure exceeds the pressure in said gas phase conduit, whereby to permit passage of gas to the vapor phase of said storage tank through said vapor phase conduit, and said inter-communicating valve chamber provided by an open ended valve casing detachably connected to the upper end of said heat exchanger over an opening communicating into the heat exchanger chamber, means sealing the joint between said valve casing and heat exchanger, a removable cap closing the upper end of said valve casing and into which said vapor phase conduit extends, said cap having laterally projecting shoulder means, post means carried by said heat exchanger and means including said post and shoulder means for clamping said cap to said valve casing and the valve body to said heat exchanger.

References Cited in the file of this patent
UNITED STATES PATENTS

| | | |
|---|---|---|
| 1,736,933 | Morgan et al. | Nov. 26, 1929 |
| 2,226,810 | Ensign et al. | Dec. 31, 1940 |
| 2,315,881 | Thomas | Apr. 6, 1943 |
| 2,341,380 | James | Feb. 8, 1944 |
| 2,408,084 | Martin | Sept. 24, 1946 |
| 2,449,118 | Holicer | Sept. 14, 1948 |
| 2,456,890 | St. Clair | Dec. 21, 1948 |
| 2,493,369 | Smith et al. | Jan. 3, 1950 |
| 2,496,518 | Candler | Feb. 7, 1950 |
| 2,551,501 | Mitchell et al. | May 1, 1951 |
| 2,558,051 | Jones | June 26, 1951 |